United States Patent [19]

Traub

[11] Patent Number: 4,566,702

[45] Date of Patent: Jan. 28, 1986

[54] SEAL ASSEMBLY WITH IMPROVED LOW PRESSURE SEALING RING

[75] Inventor: Henry A. Traub, Pacific Palisades, Calif.

[73] Assignee: W. S. Shamban & Company, Santa Monica, Calif.

[21] Appl. No.: 712,667

[22] Filed: Mar. 18, 1985

[51] Int. Cl.⁴ .......................... F16J 15/24; F16J 15/32
[52] U.S. Cl. ................. 277/121; 277/188 A; 277/194; 277/205; 277/152
[58] Field of Search .................. 277/115, 27, 117–122, 277/144, 145, 152, 153, 165, 170–172, 176, 188 R, 188 A, 190, 191, 193, 194, 205

[56] References Cited

U.S. PATENT DOCUMENTS

| | | | |
|---|---|---|---|
| 2,998,987 | 9/1961 | Taschenberg et al. | 277/153 X |
| 4,143,586 | 3/1979 | Zitting | 277/188 A X |
| 4,231,578 | 11/1980 | Traub | 277/121 |
| 4,268,045 | 5/1981 | Traub | 277/121 |
| 4,421,330 | 12/1983 | Burke | 277/188 R |

FOREIGN PATENT DOCUMENTS

| | | | |
|---|---|---|---|
| 873384 | 7/1961 | United Kingdom | 277/152 |
| 1268371 | 3/1972 | United Kingdom | 277/152 |
| 2073845 | 10/1981 | United Kingdom | 277/152 |

*Primary Examiner*—Robert S. Ward
*Attorney, Agent, or Firm*—Poms, Smith, Lande & Rose

[57] ABSTRACT

An improved low pressure seal ring configuration which is adapted for use in combination with a high pressure seal ring to provide a seal assembly which is capable of sealing first and second relatively reciprocating surfaces at both high and low pressures. The low pressure seal ring is designed to be located between the high pressure seal ring and the wall of the groove in which the seal assembly is mounted. The low pressure seal ring exerts pressure against the high pressure seal to provide desired high pressure sealing. The low pressure seal also includes a seal lip which has a tip that extends over the edge of the high pressure seal to provide low pressure sealing. The low pressure seal assembly includes a seal body portion in which the radial width of the cross section of the seal body increases away from the sealing tip to provide increased biasing force against the high pressure seal ring and to provide adequate force against the tip of the low pressure seal ring to provide low pressure sealing without causing excessive frictional wear of the sealing tip.

14 Claims, 3 Drawing Figures

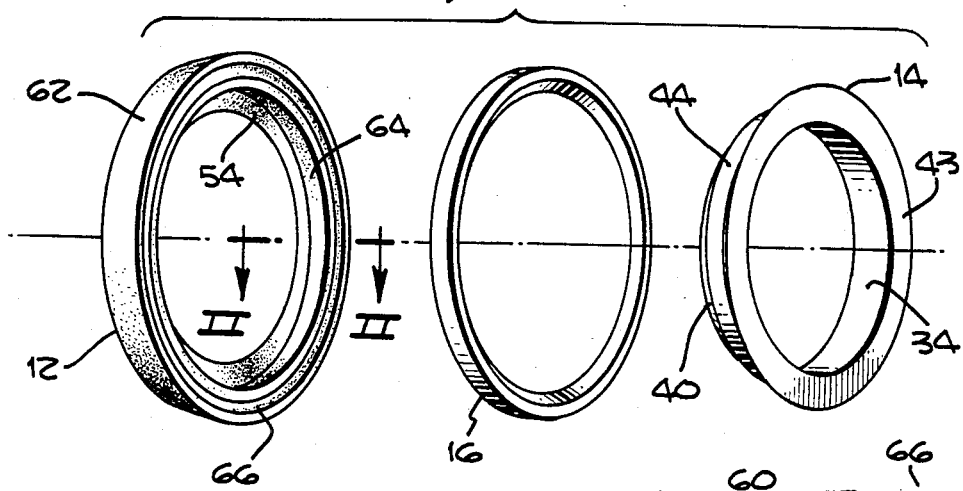

SEAL ASSEMBLY WITH IMPROVED LOW PRESSURE SEALING RING

BACKGROUND OF THE INVENTION

The present invention relates generally to multi-element sealing assemblies for effecting a seal between relatively moveable parts in both the static and dynamic mode at both high and low pressures. More particularly, the present invention relates to an improved low pressure seal ring designed for use in such multi-element seals.

Numerous different seal configurations have been designed for providing a seal between relatively reciprocating surfaces, such as pistons and the cylinders housing the pistons, under both high and low pressure conditions. In my prior U.S. Pat. Nos. 4,231,578 and 4,268,045, a number of different multi-element seal assembly embodiments are disclosed. The seal assemblies are designed to provide an effective seal during both high pressure and low pressure conditions. The contents of these two patents are hereby incorporated by reference.

The multi-element seals disclosed in my prior patents generally include a high pressure seal ring and a low pressure seal ring. The high pressure seal ring is typically made from materials such as polytetrafluoroethylene. The low pressure seal ring is typically made from an elastomeric material such as rubber or other suitable synthetic or natural material having the same elastic properties as rubber. Both the high pressure seal ring and the low pressure seal ring are conventionally housed within a groove within one of the reciprocating surfaces. The low pressure ring typically seats against the bottom of the groove, with the high pressure seal ring being located between the low pressure seal ring and the reciprocating surface to be sealed.

The low pressure seal ring is designed to provide a radial biasing force against the high pressure seal ring to insure adequate sealing at high pressures. In addition, the low pressure seal ring includes a seal lip portion or wiper arm which extends out past the end of the high pressure seal to provide direct contact and low pressure sealing between the low pressure seal ring and the reciprocating surface to be sealed.

In my above referenced prior patents, the radial width of the low pressure seal ring is oversized so that the low pressure seal ring provides a compressive force against the high pressure seal ring. The low pressure seal ring is compressed within the seal groove. Additionally, the low pressure seal ring is designed to be over-sized so that a radial compressive force is exerted against the seal lip or wiper arm to thereby promote sealing at low pressures. Although the use of an over-sized low pressure seal ring provides desirable biasing of the seal lip against the reciprocating surface, it was found that the particular over-sized configurations being used resulted in increased friction and excessive wear of the tip portion of the low pressure seal ring lip. Accordingly, it would be desirable to provide a low pressure seal ring which provides adequate biasing of the seal lip against the reciprocating surface to prevent leakage during both high and low pressure operation while reducing wear on the seal lip.

SUMMARY OF THE INVENTION

The present invention is based upon a low pressure seal ring which is adapted for use in combination with a high pressure seal ring to provide a seal assembly which is capable of sealing first and second relatively reciprocating surfaces at both high and low pressures.

The high pressure seal ring which is used in conjunction with the low pressure seal ring includes an inner sealing surface for sealing contact with the first reciprocating surface and a low pressure seal ring support portion. The low pressure seal ring support portion includes an outer low pressure seal ring support surface having an inclined seal lip support surface which tapers inward towards the inner sealing surface. The seal lip support surface has a left end which terminates near the inner sealing surface to provide a high pressure seal apex adjacent the first reciprocating surface. The low pressure seal ring support surface on the high pressure seal furhter includes an axial low pressure seal body support surface which is substantially parallel to the high pressure seal inner sealing surface with the seal body support surface having a left end which meets the right end of the seal lip support surface.

The low pressure seal ring in accordance with the present invention includes an annular seal ring body comprising a seal lip portion having a bottom seal lip surface which is adapted to be supported by the seal lip support surface of the high pressure seal ring. The seal lip surface includes an annular sealing tip at its left end which extends out past and adjacent to the apex of the high pressure seal ring to provide sealing contact between the sealing tip and the first reciprocating surface.

The low pressure seal ring further includes a seal body portion having a left part integral with the seal lip portion and a right part. The seal body portion further includes an outer surface and an inner surface with the outer surface adapted to sealingly contact the second reciprocating surface. The inner surface is adapted to be supported by the support surface of said high pressure seal ring.

As a particular feature of the present invention, the outer and inner surfaces of the seal body portion diverge from each other from the seal body left part to the seal body right part to provide an increase in the radial width of the cross section of the seal body portion to thereby increase the compressive forces exerted on the seal body right part when the low pressure seal is positioned between the second reciprocating surface and the high pressure seal ring. This particular seal body configuration provides the desired biasing of the sealing tip against the first reciprocating surface to provide low pressure sealing while maintaining axial compressive forces at relatively low levels to reduce the amount of friction induced wear experienced by the sealing tip.

As another feature of the present invention, the low pressure seal body includes a right side surface having an annular groove therein. The annular groove defines an expansion zone into which the seal body right part may flow when the seal body is compressed between the first and second reciprocating surfaces during operation. The flow of the right part part into the expansion zone ensures radial compression of the right part without excessive radial compressive force.

As another feature of the present invention, a cam ring is provided in association with the high pressure seal ring for providing positive engagement of the right part of the high pressure seal ring with the first and second reciprocating surfaces to protect the right part of the outer surface of the low pressure seal ring against extrusion.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is an exploded view of a preferred seal assembly in accordance with the present invention showing the low pressure seal, cam ring and high pressure seal.

FIG. 2 is a sectional view of the low pressure ring shown in FIG. 1 taken in the II—II plane.

FIG. 3 is a sectional view of the preferred ring assembly shown in FIG. 1 which is mounted within the groove of a cylinder wall for sealing to a reciprocating piston.

DETAILED DESCRIPTION OF THE INVENTION

A preferred exemplary seal assembly is shown generally at 10 in FIGS. 1 and 3. The seal assembly 10 includes a low pressure seal ring 12, high pressure seal ring 14 and a cam ring 16. The seal assembly 12 is designed for use in sealing relatively reciprocating parts such as cylinders and pistons commonly used in hydraulic devices and equipment.

Referring to FIG. 3, the seal assembly 10 is shown in position for providing a seal between piston 18 and cylinder 20. The outer surface 22 of piston 18 defines a first reciprocating surface which slides back and forth parallel to the axis of the piston 18 relative to cylinder 20. The inner surface 24 on cylinder 20 defines a second reciprocating surface. The second reciprocating surface 24 includes an annular groove 26 having a bottom surface 28 and side surfaces 30 and 32. The groove 26 has an open top 33.

During relative reciprocal movement of piston 18 and cylinder 20, the seal assembly 10 will be subjected to a wide range of pressures ranging from relatively high pressures of 5,000 psi and above down to relatively low pressures in the range of a few psi. At high pressures, the majority of sealing action provides by seal assembly 10 is due to high pressure seal 14. At lower pressures, the majority of the sealing action provided by seal assembly 10 is due to the low pressure seal ring 12. At intermediate pressures, both the high pressure seal ring 14 and low pressure seal ring 12 contribute to the sealing action provided by seal assembly 10.

The high pressure seal ring 14 includes an inner sealing surface 34 for sealing contact with the piston outer surface 22. The high pressure seal ring 14 also includes a low pressure seal ring support portion 36. The low pressure seal ring support portion 36 includes an outer low pressure seal ring support surface shown generally at 38. The low pressure seal ring support surface 38 includes an inclined seal lift support surface 40 which tapers inward towards the inner sealing surface 34. The seal lip support surface 40 includes a left end which terminates near the inner sealing surface 34 to provide a high pressure seal apex 42. The high pressure seal 14 further includes a right end 43.

The high pressure seal 14 is similar in design and operation to the high pressure seal rings disclosed in my two prior patents which have been previously incorporated by reference. The high pressure seal ring 14 is made from any suitable high pressure seal material such as polytetrafluoroethylene.

The low pressure seal ring support surface 38 on the high pressure seal ring 14 also includes an axial low pressure seal body support surface 44 which is substantially parallel to the inner sealing surface 34. The seal body support surface 44 includes a left end 46 which meets the right end of the seal lip support surface 40.

Referring to FIG. 2, the preferred low pressure seal ring in accordance with the present invention is shown generally at 12. The low pressure seal ring 12 includes an annular seal ring body 48 which includes a seal lip portion 50 and a seal body portion 52. The seal lip portion 50 includes a bottom seal lip surface 54 which is adapted to be supported by the seal lip support surface 40. The seal lip surface 54 includes an annular sealing tip 56 at its left end. The seal lip portion 50 is sized so that the sealing tip 56 extends out past and adjacent to the apex 42 of the high pressure seal ring 14 for sealing contact with the piston surface 22.

The seal body portion 52 includes a left part 58 which is integral with the seal lip portion 50 and a right part 60. The seal body portion 52 includes an outer surface 62 and an inner surface 64. The outer surface 62 is designed to sealingly contact the groove bottom 28 in cylinder 20 with the inner surface 64 being adapted to contact the seal body support surface 44 on the high pressure seal ring 14. In accordance with the present invention, the outer surface 62 and inner surface 64 diverge from each other from the seal body left part 58 to the seal body right part 60 to provide an increase in the radial width of the cross section of the seal body portion 52. The degree of divergence between surfaces 62 and 64 will vary as necessary to maintain a minimum of 5% compression at maximum radial width of body portion 52. The angle of divergence between the surfaces 62 and 64 is represented by phantom lines 66 and 68 in FIG. 2 and is preferably varied between 5-15 degrees with 10 degrees being particularly preferred. The increase in radial width of the seal body portion 52 towards the right side produces an angular compressive force through the seal body 48 which is angularly directed away from the sealing tip 56 which then acts more or less independent of the compressive force. The overall degree of compressive force exerted by the low pressure seal ring against the piston surface 22 and seal body support surface 44 can be controlled by varying the thickness of the seal body 48. For example, in order to increase the pressure of the low pressure seal ring 12 against the high pressure seal ring 14, the low pressure seal ring vertical width is increased while the depth of groove 10 is kept constant. This provides a means for increasing the radial pressure exerted by the low pressure seal ring at the right outer leak path when it is compressed into place as shown in FIG. 3.

The low pressure seal ring 12 includes an annular groove 66 in the right side of the seal body portion 52. The groove 66 defines an expansion zone 68 into which the seal body portion 52 may expand during compression of the low pressure seal ring 12 during initial installation and high pressure operation. The expansion zone 68 helps to maintain a constant downward biasing force on the low pressure seal ring inner surface 64, bottom seal lip surface 54.

A cam ring 16 is provided as shown in FIG. 3 for providing positive engagement of the right part of the high pressure seal ring 43 with the first reciprocating surface 22 and groove right side 32 to protect the right part of the outer surface 62 of the low pressure seal ring against extrusion. The use of cam rings, such as cam ring 16, in conjunction with low pressure and high pressure seal ring assemblies is well known and discussed in detail in my previously referenced patents.

The present invention is an improvement over existing low pressure seal rings in which the vertical width of the seal body remains constant or includes an upward protrusion or arm located above the seal lip portion of the low pressure seal ring. These conventional seals produce a constant radial compressive force across the low pressure seal body with the compressive force being increased, when desired, directly above the sealing tip by way of the upwardly extending protrusion or arm. Fracturing sometimes will occur at the junction of the protrusion with the outer surface of the body. The upwardly sloping outer surface 62 on the low pressure seal ring in accordance with the present invention provides for variable radial compressive forces across the low pressure seal ring which increase towards the side fo the seal body opposite the seal lip. The low pressure seal ring configuration in accordance with the present invention improves the sealing characteristics of sealing tip 56 without substantially increasing the amount of friction induced wear. In addition, the compressive force against high pressure seal ring 14 is also increased to enhance the low pressure sealing characteristics of the seal without undesirable increases in compressive forces against sealing tip 56 which would result if the conventional flat top low pressure seal ring is used.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited to the following claims.

What is claimed is:

1. A low pressure seal ring adapted for use in combination with a high pressure seal ring to provide a seal assembly which is capable of sealing first and second relatively reciprocating surfaces at both high and low pressures, wherein said high pressure seal ring includes an inner sealing surface for sealing contact with said first reciprocating surface and a low pressure seal ring support portion, said low pressure seal ring support portion including an outer low pressure seal ring support surface having an inclined seal lip support surface which tapers inward towards said inner sealing surface, said seal lip support surface having a left end which terminates at said inner sealing surface to provide a high pressure seal apex adjacent said first reciprocating surface and a right end, said low pressure seal ring support surface further including an axial low pressure seal body support surface which is substantially parallel to said inner sealing surface, said seal body support surface having a left end which meets the right end of said seal lip support surface, wherein said low pressure seal ring comprises:

an annular seal ring body comprising:
a seal lip portion having a bottom seal lip surface adapted to be supported by the seal lip support surface of said high pressure seal ring, said seal lip surface including an annular sealing tip at its left end said sealing tip extending out past and adjacent to the apex of said high pressure seal ring for sealing contact with said first reciprocating surface; and a seal body portion having a left part integral with said seal lip portion and a right part, said seal body portion further including an outer surface and an inner surface, said outer surface adapted to sealingly contact said second reciprocating surface and said inner surface adapted to be supported by the support surface of said high pressure seal ring, wherein said outer and inner surfaces diverge from each other from said seal body left part to said seal body right part to provide an increase in the radial width of the cross section of said seal body to thereby increase the compressive forces exerted on said seal body right part when said low pressure seal ring is positioned between said second reciprocating surface and said high pressure seal ring.

2. A low pressure sealing ring according to claim 1 wherein said seal body is made from an elastomer.

3. A low pressure sealing ring according to claim 1 wherein said right part of said seal body includes a right side surface having an annular groove therein defining an expansion zone into which said seal body right part may expand when said seal body is compressed between said first and second reciprocating surfaces.

4. A low pressure sealing ring according to claim 3 wherein said annular groove has an arcuate cross section.

5. A low pressure sealing ring according to claim 1 wherein said seal body outer surface diverges from said seal body inner surface at an angle of between 5 to 15 degrees.

6. A low pressure sealing ring according to claim 4 wherein said seal body outer surface diverges from said seal body inner surface at an angle of about 10 degrees.

7. A seal assembly for providing a seal between first and second reciprocating surfaces at both high and low pressures wherein said second surface includes an annular groove in which said seal assembly is housed, said groove having a bottom, side surfaces and an open top, said seal assembly comprising:

a high pressure seal ring having an inner sealing surface for sealing contact with the first reciprocating surface and a low pressure seal ring support portion, said low pressure seal ring support portion including an outer low pressure seal ring support surface having an inclined seal lip support surface which tapers inward towards said inner sealing surface, said seal lip support surface having a left end which terminates near said inner sealing surface to provide a high pressure seal apex adjacent said first reciprocating surface and a right end, said low pressure seal ring support surface further including an axial low pressure seal body support surface which is substantially parallel to said inner sealing surface, said seal body support surface having a left end which meets the right end of said seal lip support surface; and a low pressure seal ring located between said groove bottom and the low pressure seal ring support surface of said high pressure seal ring, said low pressure seal ring including an annular seal ring body comprising:

a seal lip portion having a bottom seal lip surface adapted to be supported by the seal lip support surface of said high pressure seal ring, said seal lip surface including an annular sealing tip at its left end, said sealing tip extending out past and adjacent to the left end of said seal lip support surface for sealing contact with said first reciprocating surface; and a seal body portion having a left part integral with said seal lip further including an outer surface and inner surface, said outer surface adapted to contact the bottom of said groove and said inner surface adapted to be supported by the support surface of said high pressure seal ring, wherein said outer and inner surfaces diverge from each other from said seal body left part to said seal body right part to provide an increase in the radial width of the cross section of said seal body to thereby increase the compressive forces exerted on said seal body right part when said low pressure seal ring is positioned between said groove bottom and said high pressure seal ring.

8. A seal assembly according to claim 7 further including cam ring means for providing positive engagement of said high pressure seal ring with said first and second reciprocating surfaces.

9. A seal assembly according to claim 7 wherein said right part of said seal body includes a right side surface having an annular groove therein defining an expansion zone into which said seal body right part may flow when said seal body is compressed between said groove bottom and high pressure seal ring.

10. A low seal assembly according to claim 9 wherein said annular groove has an arcuate cross section.

11. A seal assembly according to claim 7 wherein said seal body outer surface diverges from said seal body inner surface at an angle of between 5 to 15 degrees.

12. A seal assembly according to claim 7 wherein said seal body outer surface diverges from said seal body inner surface at an angle of about 10 degrees.

13. A seal assembly according to claim 7 wherein said high pressure seal ring is made from polytetrafluoroethylene and said low pressure seal ring is an elastomer.

14. In a seal assembly for providing a seal between first and second relatively reciprocating surfaces at both high and low pressures, said first surface having a groove therein with a bottom, sides and open top for housing said seal assembly, said seal assembly including a high pressure seal ring having an inner sealing surface for sealing contact with said first reciprocating surface and an outer low pressure seal ring support surface, said seal assembly further including a low pressure seal ring positioned between said groove bottom and said support surface on said high pressure seal ring, said low pressure seal ring including a seal lip portion having an annular sealing tip at its left end and a seal body portion having a left end integral with the right end of said seal lip portion and a right end, wherein the improvement comprises:

outer and inner surfaces on said low pressure seal ring, said outer surface adapted to sealingly contact said groove bottom and an inner surface adapted to contact said support surface on said high pressure seal ring, wherein said outer and inner surfaces diverge from each other from said seal body left part to said seal body right part to provide an increase in the radial width of the cross section of said seal body to thereby increase the compressive forces exerted on said seal body right part when said low pressure seal ring is positioned between said groove bottom and said high pressure seal ring.

* * * * *